United States Patent [19]

Clemmer

[11] Patent Number: 4,904,021
[45] Date of Patent: Feb. 27, 1990

[54] LEANING SUPPORT FOR A VEHICLE SEAT BACK

[76] Inventor: Edith R. Clemmer, 2021 Fairhill, Fort Wayne, Ind. 46808

[21] Appl. No.: 268,375

[22] Filed: Nov. 7, 1988

[51] Int. Cl.$^4$ ................................................. A47C 1/10
[52] U.S. Cl. ...................................... 297/397; 297/399
[58] Field of Search ............... 297/397, 399, 400, 401, 297/402, 407, 227

[56] References Cited

U.S. PATENT DOCUMENTS

| | | |
|---|---|---|
| 1,626,533 | 4/1927 | Hergershausen . |
| 1,787,832 | 1/1931 | Mueller ................................. 297/391 |
| 2,392,024 | 1/1946 | Couri ..................................... 46/162 |
| 2,555,814 | 6/1951 | Pulsifer ................................ 155/173 |
| 2,638,152 | 5/1953 | Pulsifer ................................ 297/400 |
| 2,983,310 | 5/1961 | Warlick et al. ..................... 297/399 |
| 3,046,057 | 7/1962 | Smetko ................................ 297/397 |
| 3,185,497 | 5/1965 | Lagace ................................ 297/397 |
| 3,292,973 | 12/1966 | Cogut ................................. 297/397 |
| 3,578,383 | 5/1971 | Earl ..................................... 297/391 |
| 3,601,445 | 8/1971 | Glynias .............................. 297/404 |
| 3,608,964 | 9/1971 | Earl ..................................... 297/397 |
| 3,634,925 | 1/1972 | Van Loo ............................. 297/227 |
| 3,779,599 | 12/1973 | Gottfried ........................... 297/397 |
| 3,830,898 | 8/1974 | Johnson et al. .................... 264/45 |
| 4,619,483 | 10/1986 | Dickey et al. .................... 297/397 |
| 4,666,417 | 5/1987 | Hillman ............................. 446/267 |
| 4,679,262 | 7/1987 | Davis et al. ....................... 5/434 |

FOREIGN PATENT DOCUMENTS

| | | | |
|---|---|---|---|
| 225872 | 2/1963 | Austria ............................. 297/391 |
| 734250 | 7/1955 | United Kingdom ............... 297/399 |

Primary Examiner—Francis K. Zugel
Attorney, Agent, or Firm—Jeffers, Hoffman & Niewyk

[57] ABSTRACT

A soft, resilient column is provided for use as a cushioned support upon which a passenger in a vehicle may lean. The column is positioned in a vertical direction contiguous to the backrest of a vehicle seat, so that the user may lean sideways against a soft surface while traveling in the vehicle. The column is bendable, and its lower end is tucked into the crevice of the seat to hold the column in its vertical position when the user leans against the column.

19 Claims, 1 Drawing Sheet

LEANING SUPPORT FOR A VEHICLE SEAT BACK

BACKGROUND OF THE INVENTION

The invention relates, in general, to a vertical support for use with a chair or other article of furniture and in particular to a soft, resilient, removable support particularly adapted for use as a leaning support cushion by passengers traveling in vehicles.

Providing comfort to passengers who must endure long periods of time in a vehicle while traveling is a goal that has thus far escaped practical solution. It is common for passengers, and especially children, to become tired during such trips. Frequently, these passengers tend to lean against the doors, windows and even other passengers in an attempt to attain a comfortable position. Common bench-type seats and even so-called "bucket" type seats do not provide adequate lateral support for sideways leaning. Leaning against windows and/or doors is unsatisfactory due to the hardness of those surfaces and the tendency to bounce against the surfaces as a result of the normal jarring of the vehicle while in transit, as well as during acceleration and deceleration of the vehicle. Placing a pillow or similar object against the window or door provides some relief against the hardness of the surface, however, the continual jarring of the doors and window during transit prevents from the passenger from attaining any significant level of comfort.

The difficulty of attaining a comfortable position is even greater for small children because their heads often do not reach the top of the vehicle seat back. Thus, there is no support for the head and this creates considerable lateral instability if the child should fall asleep and slump over. Even if the child or adult is restrained by a seat belt and shoulder strap, the head will tilt sideways for a very uncomfortable position if the passenger falls asleep.

Several attempts have been made to provide devices capable of increasing the comfort of passengers while traveling in vehicles. U.S. Pat. No. 2,983,310 discloses a headrest that is attached to a vehicle seat and functions in the nature of a pillow. The headrest comprises a cushion that is filled with a resilient material such as foam rubber. This device provides a comfortable surface upon which the passenger can rest his or her head, however, no lateral or other support is provided for the upper torso of the body. U.S. Pat. No. 3,601,445 provides a portable headrest for use by passengers in automobiles, buses and the like. Suctions cups attached to the inner surface of the window support a base upon which a cushion is mounted. The cushion is adjustable to several different positions, ranging from an incline to a fully horizontal plane, according to the preference of the user. This device also provides support only for the head and neck area and does not offer support for any other parts of the body. When using these devices, the movement of the head of the passenger is restricted to that small area covered by the headrest, which can result in discomfort and stiffness to the body and neck of the user.

It is desired to provide a device that will present a comfortable surface upon which a passenger may lean, and further to provide a surface that is resilient and capable of being moved to different positions in the vehicle seat. Additionally, it is desired to provide this device at a low cost. Also, it is desired to provide a device of the type described that is portable and lightweight so that it may be easily inserted and removed from a vehicle according to the preference of the passenger.

SUMMARY OF THE INVENTION

The present invention overcomes the problems and disadvantages of the prior art by providing an inexpensive, soft, resilient cushion upon which an individual may lean while traveling in a vehicle.

In general, the invention provides a soft, resilient column that is vertically positioned and is engaged with the backrest of the vehicle seat. The column extends the entire height of the backrest and provides a lateral support upon which the passenger may lean the entire upper portion of his body, rather than merely his head and neck as with the prior art head rests. The column is made from relatively inexpensive materials, is lightweight and may easily be removed from the seat when not in use.

When positioning the column in the vehicle, the column may be bent so that its lower portion can be tucked into the crevice formed at the juncture of the backrest and the vehicle seat. When the column has been tucked into this crevice, it is held in a relatively fixed position with the backrest of the seat so that it can support the weight of a passenger, and at the same time retain its vertical orientation. Additional support may be added by folding the upper edge of the column inwardly and extending it over the backrest of the vehicle seat. Further support may be added by forming the outer surface of the column of a suitable material that maintains a high coefficient of friction with the fabric backrest of the vehicle seat, such as a soft urethane form. This high coefficient of friction creates a "gripping" effect between the surfaces which assists in holding the column against the backrest when a weight is applied to the side of the column.

In addition to its soft, resilient outer body, the column has a bendable inner core extending substantially the entire length of the column. The core provides a semi-rigid frame for the column and is formed of a deformable, malleable material, such as a metal wire. The core provides rigidity to the column to enable it to absorb the weight of the individual leaning against it, while maintaining its relatively fixed position with respect to the backrest of the vehicle. The column is not so rigid, however, to cause any difficulty to the user in bending the column to the desired position.

An advantage of the above invention is that it provides a soft surface upon which an individual may lean while occupying a seat, such as a seat in a motor vehicle.

Another advantage of the above invention is that it provides a cushioned support for a passenger to use while traveling in a vehicle that may be easily inserted or removed from the vehicle.

A further advantage of the above invention is that it provides a lateral support for a passenger in a vehicle that is constructed from inexpensive materials and may be purchased at a low cost.

A still further advantage of the above invention is that it provides a comfortable leaning support for the entire upper side portion of the body of a passenger in a vehicle.

Yet another advantage of the above invention is that the support may easily be moved from one side of the passenger to the other, in order to enable the user to change position and lean on his or her opposite side. Alternatively, the user may place a column on each of his or her sides to accommodate changes of body position without the necessity of changing the position of the column.

The invention, in one form thereof, comprises in combination with a vehicle seat having a backrest, a vertical, elongated column contiguous with the backrest that provides a lateral support upon which a passenger may lean while occupying the vehicle seat. The column has a soft, resilient outer body and a lower end that can be tucked into the crevice formed by the juncture of the seat and the backrest to provide support to retain the column in its vertical position. Additional support for the column may be provided by bending the upper end over the back seat. Further support for the column may be obtained by forming the outer surface of the column of a material that has a high coefficient of friction with the backrest, resulting in a frictional engagement between the backrest and the column.

These and other features of the present invention will become apparent to those skilled in the art upon a reading of the following detailed description when taken in conjunction with the drawings, wherein there is shown and described an illustrative embodiment of the invention.

DETAILED DESCRIPTION OF A PREFERRED EMBODIMENT

Figure 1:
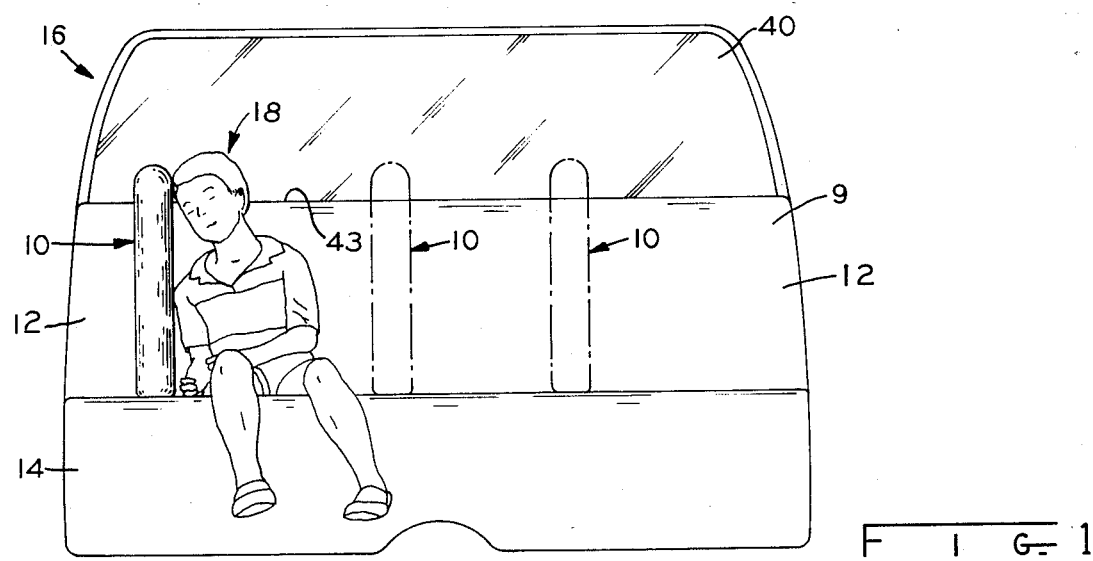
FIG. 1 is a front view of a vehicle seat with the column of the present invention positioned in several locations contiguous with the backrest of the vehicle seat, and showing a child leaning against a column.

Referring now to the drawings, there is shown a vertical column 10 positioned contiguous to the occupant supporting surface 9 backrest 12 of seat 14 in vehicle 16. A passenger 18 is shown leaning upon column 10 (FIG. 1). The body of column 10 is preferably made of a soft, resilient material, such as low density polyurethane foam. It is preferred that the outer body be soft in order to provide for the comfort of the user, and provide for a high coefficient of friction with the seat back and that it be resilient in order to allow for easy change of position by the user without a loss of the cushioning effect provided by the column. In the preferred mode, the column is elongated and somewhat cylindrical in shape, although other configurations may be substituted without departing from the scope of the invention.

Figures 2, 3:
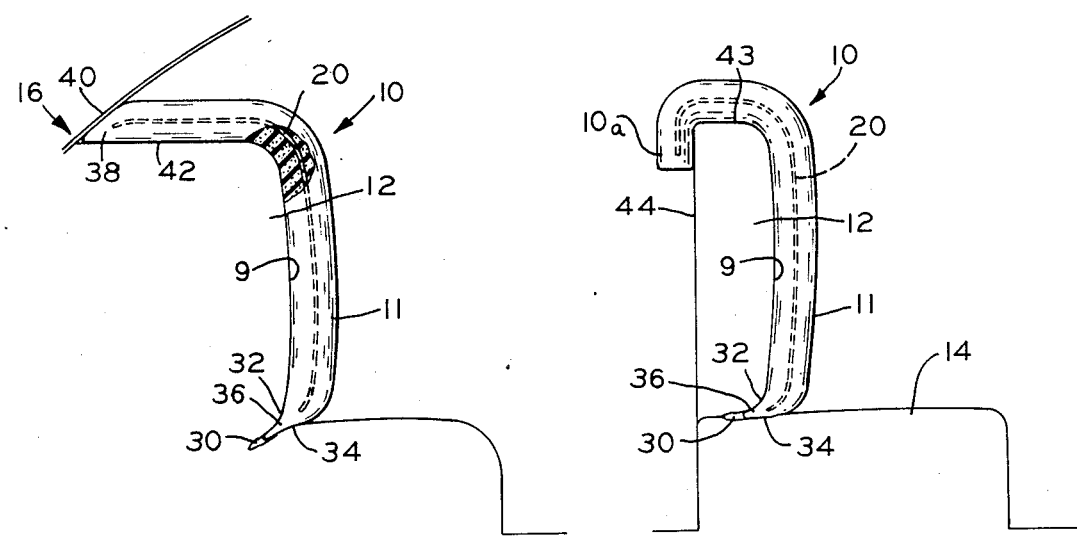
FIG. 2 is a side view of a vehicle rear seat and backrest having a column positioned contiguous with the backrest, and showing the upper end of the column extending over the rear deck adjoining the backrest.
FIG. 3 is a side view of a vehicle seat and backrest having the column positioned contiguous with the backrest, and showing the upper end of the column bending over the top and against the back of the backrest.
Figure 4:
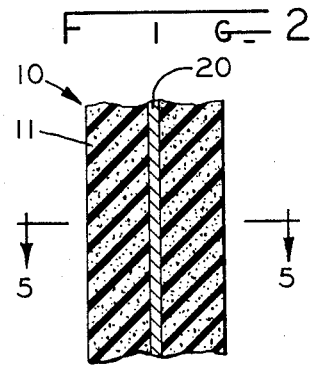
FIG. 4 is a fragmentary sectional view of the column according to the invention.
Figure 5:
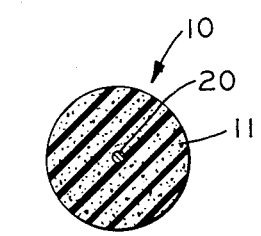
FIG. 5 is a sectional view taken along line 5—5 of FIG. 4.

In a preferred embodiment, column 10 has an inner core 20 extending substantially the entire length of the column (FIGS. 4, 5). Inner core 20 is enclosed within outer body 11 of column 10. Inner core 20 is made from a deformable, malleable material, such as a metal wire, and provides an inner, skeletal framework for outer body 11. Core 20 imparts a semi-rigid, yet bendable, condition to column 10, as seen in FIGS. 2 and 3, wherein column 10 is bent over backrest 12. It is possible to form column 10 of an outer material that is bendable and capable of retaining the bent shape without the use of an inner core. However, the preferred mode includes the use of an inner core due to the strength and rigidity added to the column by this skeletal framework. As a result of the use of a semi-rigid inner core, a softer and more resilient outer body can be used for column 10, which will be preferred by the passenger. Inner core 20 may also be of other shapes in order to conform generally to the shape of column 10 and provide the necessary support. For example, core 20 could comprise a metal wire formed in a generally rectangular loop or could comprise a flat malleable strip. As an alternative to the use of a metal wire or strip, a rigid, jointed inner frame may be employed that would be bendable only at designated joints.

In FIG. 2, column 10 has been bent at lower portion 36 and tucked into crevice 30. Crevice 30 is formed by the juncture of lower portion 32 of backrest 12, and inward portion 34 of seat 14. The resiliency of the polyurethane foam material comprising outer body 11, and the bendability of inner core 20 enables portion 36 to be inserted in this manner. Column 10 is tightly held in crevice 30, which enables column 10 to be held snugly in the vertical position shown in FIG. 1. Alternatively, it is possible to taper the ends, or merely one end, of column 10 in order to allow for easy placement of the ends of column 10 in the desired position. For instance, lower end 36 of column 10 (FIGS. 2, 3) may be tapered to provide for easy insertion into crevice 30, or for deeper penetration into crevice 30 than may be possible with a non-tapered end. This deep penetration into crevice 30 provides a secure support for column 10, and prevents easy displacement of column 10 from its desired position when leaned upon by a passenger.

Further support may be provided at upper end 38 of column 10 by wedging said upper end 38 between window 40 and rear deck 42 of vehicle 16. Rear deck 42 bridges the area between backrest 12 and window 40. The combination of the aforementioned tucking of lower column portion 36 in crevice 30, and wedging of upper column portion 38 in the manner described provide a secure support to retain column 10 in its vertical orientation. Either support may be used exclusive of the other, however, it is preferred that they be utilized in tandem. When utilizing the column in combination with vehicle seat backrests that are freestanding, that is, with backrests that do not have a rear deck adjoining a window, column 10 may be bent and placed over the top edge 43 and back of backrest 12 in the manner shown in FIG. 3.

Upper end portion 10a of column 10 is bent inwardly in the nature of a hook, and positioned contiguous with back side 44 of backrest 12, while maintaining column 10 contiguous with backrest 12 in its upright position.

The outer surface of column 10 is preferably slip-resistant and made of a material that has a high coefficient of friction with the material forming the outer surface 9 of backrest 12. The use of a slip-resistant material which has high coefficient of friction with the material of the backrest enables column 10 to maintain a frictional engagement with backrest 12, which assists in preventing displacement of column 10 when passenger 18 leans against the column. It is desired to utilize material as fabric for column 10, and for backrest 12, to maintain as a high a coefficient of friction as possible, in order to create a "gripping" effect of column 10 to backrest 12. This gripping effect is preferably utilized in conjunction with the previously described mechanisms utilized to support the column in its vertical position.

The length of column 10 is greater than 24 inches and should preferably be between 64 inches and 90 inches. A column of this length would extend the entire height of most vehicle seat backrests and provide an additional portion to be tucked into a seat crevice, and to extend over the backrest in the manner shown in FIGS. 2 and 3. The particular diameter of the column is not critical and may vary dependent upon the softness of the material used in outer layer 11 of column 10, however, a diameter of between 6 and 8 inches is generally acceptable.

It will be appreciated that the foregoing is presented by way of illustration only, and not by way of any limitation, and that various alternatives and modifications may be made to the illustrated embodiment without departing from the spirit and scope of the invention.

What is claimed is:

1. In combination with a backrest of a seat having an occupant supporting surface, a vertical elongated column contiguous with the occupant supporting surface of the backrest to provide a lateral support upon which a person may lean while occupying the seat, said column having a soft, resilient, outer body that frictionally grips the surface of the backrest to resist sliding of the column relative to the backrest when lateral force is applied to the column, the column further comprising a deformable, malleable inner core extending within said column, said inner core being covered by said outer body, the column further comprising an upper edge and back, the upper portion of said column being bent inwardly over the edge and back of said backrest whereby said backrest provides support to hold said column in its vertical position.

2. In combination with a backrest of a set having an occupant supporting surface, a vertical elongated column contiguous with the occupant supporting surface of the backrest to provide a lateral support upon which a person may lean while occupying the seat, said column having a soft, resilient, outer body that frictionally grips the surface of the backrest to resist sliding of the column relative to the backrest when lateral force is applied to the column, the column further comprising a deformable, malleable inner core extending longitudinally within said column, said inner core being covered by said outer body, and wherein the seat is a vehicle seat and includes a lower seat portion, a crevice is formed at the juncture of the backrest and the lower seat portion of the vehicle seat, further characterized by said column having an upper portion and a lower portion wherein said lower portion of the column is inserted into said crevice, whereby said crevice provides lateral support to hold said column in its vertical position.

3. The combination of claim 2 wherein said lower portion of said column is tapered.

4. The combination of claim 2 further characterized by said backrest of said vehicle seat having a rear deck extending backwardly from its upper rear portion to a rear window of the vehicle, said rear deck and said window meeting and forming an angle of less than 90°, wherein the upper portion of said column is wedged between said window and said rear deck.

5. The combination of claim 1 in which said outer body of the column is made of a material having a high coefficient of friction with the backrest, whereby said column is held in its vertical position as a result of the frictional engagement between said outer body and said backrest.

6. The combination of claim 1 in which said column has an outer body made of a polyurethane foam material.

7. The combination of claim 1 in which said column has a slip-resistant outer surface.

8. The combination of claim 1 in which said inner core extends substantially the length of said column, and retains the shape to which it is bent.

9. In combination with a vehicle seat having a backrest extending generally upwardly from an rear portion of the lower seat portion of said vehicle seat, said seat and said backrest converging at a juncture that comprises a crevice extending longitudinally between said seat and said backrest, a vertical elongated column contiguous with the backrest to provide a lateral support upon which a passenger may lean while occupying the seat, said column having a soft, resilient outer body that frictionally grips the surface of the backrest to resist sliding of the column relative to the backrest when lateral force is applied to the column, a lower portion of said column being tucked into said crevice between said lower seat portion and said backrest whereby said column is supported in its vertical position and in which said column further comprises a deformable, malleable inner core extending substantially the length of said column, said inner core being covered by said outer body.

10. The combination of claim 9 in which an upper portion of said column is bent inwardly over a top and back portion of said backrest and in adjoining relationship with said top and back portion, whereby support is provided to hold said column in its vertical position.

11. The combination of claim 9 further characterized by said backrest of said vehicle seat having a rear deck extending rearwardly from its upper rear portion to a window of the vehicle, said rear deck and said window meeting and forming an angle of less than 90°, wherein an upper portion of said column is bent inwardly so that it is wedged between said window and said rear deck.

12. The combination of claim 9 in which said outer body of the column is made of a material having a high coefficient of friction with the backrest, whereby said column is held in its vertical position as a result of said frictional engagement between said outer body and said backrest.

13. The combination of claim 9 in which said column has an outer body made of polyurethane foam material.

14. The combination of claim 9 in which said body has a slide-resistant outer surface.

15. The combination of claim 9 in which said column is removable from said vehicle seat.

16. In combination with a vehicle seat, a leaning support comprising a vertical elongated column, contiguous with a backrest of said seat to provide lateral support for the upper torso of a passenger occupying said seat, said column having a soft, resilient outer body that frictionally grips the surface of the backrest to resist sliding of the column relative to the backrest when lateral force is applied to the column, said outer body having an outer surface of a material having a high coefficient of friction with said vehicle seat, said column further comprising a deformable, malleable inner core extending within said column, said inner core being covered by said outer body, said inner core retaining the shape to which it is bent, said column having a length that will extend substantially the entire height of said seat, the length of said column being greater than 24 inches.

17. The leaning support of claim 16 wherein the length of the column is between 64 inches and 90 inches.

18. The leaning support of claim 16 wherein said inner core comprises a malleable metal rod.

19. The leaning support of claim 16 wherein said column has a lower end that is tapered.

* * * * *